United States Patent
Kuo et al.

(10) Patent No.: US 9,139,098 B2
(45) Date of Patent: Sep. 22, 2015

(54) COLLECTOR DEVICE OF ELECTRIC TRAIN AND COLLECTOR METHOD THEREOF

(71) Applicant: National Taiwan University of Science and Technology, Taipei (TW)

(72) Inventors: Ming-Tse Kuo, Taipei (TW); Wen-Yi Lo, Taipei (TW); Yao-Yi Wang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 238 days.

(21) Appl. No.: 13/916,596

(22) Filed: Jun. 13, 2013

(65) Prior Publication Data

US 2014/0202816 A1 Jul. 24, 2014

(30) Foreign Application Priority Data

Jan. 18, 2013 (TW) .............................. 102102068 A (51) Int. Cl.
*B60L 5/20* (2006.01)
*B60L 5/38* (2006.01)

(52) U.S. Cl.
CPC ... *B60L 5/20* (2013.01); *B60L 5/38* (2013.01); *B60L 2200/26* (2013.01)

(58) Field of Classification Search
CPC ............ B60L 5/04; B60L 5/08; B60L 5/085; B60L 5/10; B60L 5/18; B60L 5/20; B60L 5/205; B60L 5/24; B60L 5/38; B60M 1/103; B60M 1/106

USPC ............................. 104/284; 105/75; 191/59.1
See application file for complete search history.

(56) References Cited

U.S. PATENT DOCUMENTS 3,783,794 A * 1/1974 Gopfert et al. ................ 104/283
5,969,233 A * 10/1999 Basche et al. ..................... 73/37
6,209,694 B1 * 4/2001 Siciliano et al. ................ 191/18

FOREIGN PATENT DOCUMENTS

DE       JP 5-68303       * 3/1993

* cited by examiner

*Primary Examiner* — Mark Le
(74) *Attorney, Agent, or Firm* — Jianq Chyun IP Office (57) ABSTRACT

A collector device of an electric train and a collector method thereof are provided. The collector device includes a collector unit and a magnetic unit. The collector unit has a first side, a second side and a graphite skateboard. The first side and the second side are the two opposite sides of the collector unit, and the graphite skateboard is disposed on the first side, wherein the first side of the collector unit is in contact with a power source having a magnetically permeable capacity via the graphite skateboard, so as to draw an operation voltage. The magnetic unit has an electromagnetic coil body. The magnetic unit is configured on the second side of the collector unit, for providing an attractive force between the collector unit with the power source, so as to reduce a contact loss rate.

6 Claims, 7 Drawing Sheets

COLLECTOR DEVICE OF ELECTRIC TRAIN AND COLLECTOR METHOD THEREOF

CROSS-REFERENCE TO RELATED APPLICATION

This application claims the priority benefit of Taiwan application serial no. 102102068, filed on Jan. 18, 2013. The entirety of the above-mentioned patent application is hereby incorporated by reference herein and made a part of this specification.

BACKGROUND

1. Field of the Application

The invention relates to a power transmission technology of an electric train, and more particularly, to a collector device of an electric train and a collector method thereof.

2. Description of Related Art

In an electrified railway power supply system, an electric train uses a pantograph to be in contact with a trolley wire, so as to introduce power into a main transformer of the electric as a power source of the electric train. However, under influences of shaking during high-speed driving, irregularity of the trolley wire, vibrations of the trolley wire and a graphite skateboard, or unevenness of rails, a contact loss situation among the pantograph and the trolley wire is prone to occur, and thereby resulting in an electric arc phenomenon. Generally, the higher the speed of the electric train, the greater the possible for the pantograph and the trolley wire to be separated, and the electric arc phenomenon is prone to occur. The electric arc phenomenon may result in unevenness for a contact surface of the graphite skateboard and influence a power supply quality. Moreover, the electric arc also influences the service life of the graphite skateboard and increases a replacement number thereof, and when it is severe, the trolley wire may be damaged and thereby affect train safety.

SUMMARY OF THE APPLICATION

In view of the above, the invention provides a collector device of an electric train and a collector method therefore, so as to solve the problem described in the prior art.

A collector device of an electric train including a collector unit and a magnetic unit is provided in the invention. The collector unit has a first side, a second side and a graphite skateboard, and the graphite skateboard is disposed on the first side, wherein the first side of the collector unit is in contact with a power source having a magnetically permeable capacity via the graphite skateboard, so as to draw an operation voltage. The magnetic unit has an electromagnetic coil body. The magnetic unit is configured on the second side of the collector unit for providing an attractive force between the collector unit and the power source so as to reduce a contact loss rate.

In an embodiment of the invention, the collector device of the electric train further includes a control unit. The control unit is coupled to the collector unit and the magnetic unit, wherein the control unit adjusts a coil current of the electromagnetic coil body according to a current sensing signal or a train speed signal related to the power source, so as to adjust a magnetic force of the magnetic unit.

In an embodiment of the invention, when the train speed signal increases, the control unit increases the coil current, and when the train speed signal decreases, the control unit decreases the coil current, or the control unit adjusts the coil current according to the current sensing signal.

In an embodiment of the invention, the power source is a trolley wire or a third rail.

In an embodiment of the invention, the collector unit is a pantograph or a collector shoe.

A collector method of an electric train including the following steps is also provided. A collector unit is provided, and this collector unit has a first side and a second side, wherein the first side and the second side are the two opposite sides of the collector unit, and the graphite skateboard is disposed on the first side. A magnetic unit having an electromagnetic coil body is provided, and the magnetic unit is configured on the second side of the collector unit. When the first side of the collector unit is in contact with a power source having a magnetically permeable capacity via the graphite skateboard to draw an operation voltage, the magnetic unit is configured to provide an attractive force between the collector unit and the power source, so as to reduce a contact loss rate.

In an embodiment of the invention, the collector method further includes the following steps: providing a control unit, and this control unit is coupled to the collector unit and the magnetic unit, wherein the control unit is configured to adjust a coil current of the electromagnetic coil body according to a current sensing signal or a train speed signal related to the power source, so as to adjust a magnetic force of the magnetic unit.

In view of foregoing, in the collector device of the invention, since a contact loss situation of the collector unit is improved using physical characteristics of the magnetic unit, an occurrence of an electric arc may be suppressed, depletions of the collector unit and the power source (trolley wire or third rail) may be reduced, and a power transmission quality of the electric train may be enhanced, thereby solving the problem described in the prior art.

It should be understood that the above general descriptions and following embodiments are only for explanation and presented as examples, but not intended to limit the scope of the invention.

BRIEF DESCRIPTION OF THE DRAWINGS

The accompanying drawings constitute a part of this specification. The drawings illustrate embodiments of the invention and, together with the description, serve to explain the principles of the invention.

DETAILED DESCRIPTION OF DISCLOSED EMBODIMENTS

Reference will now be made in detail to the exemplary embodiments of the invention, examples of which are illustrated in the accompanying drawings. Moreover, elements/components with the same or similar reference numerals represent the same or similar parts in the drawings and embodiments.

Figure 1:
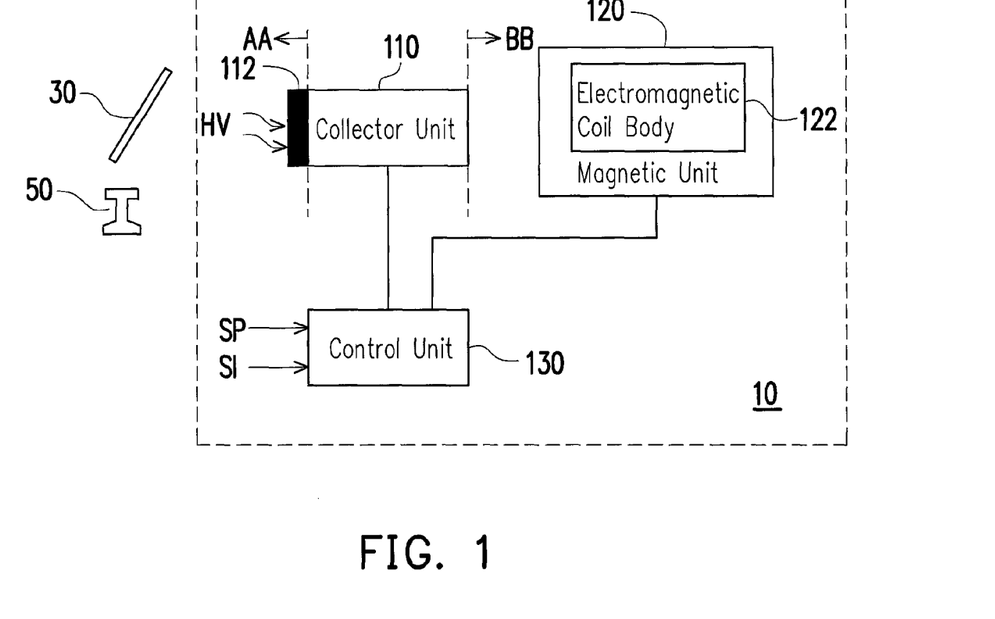
FIG. 1 is a schematic view illustrating a collector device of an electric train according to an embodiment of the invention.
Figure 2:
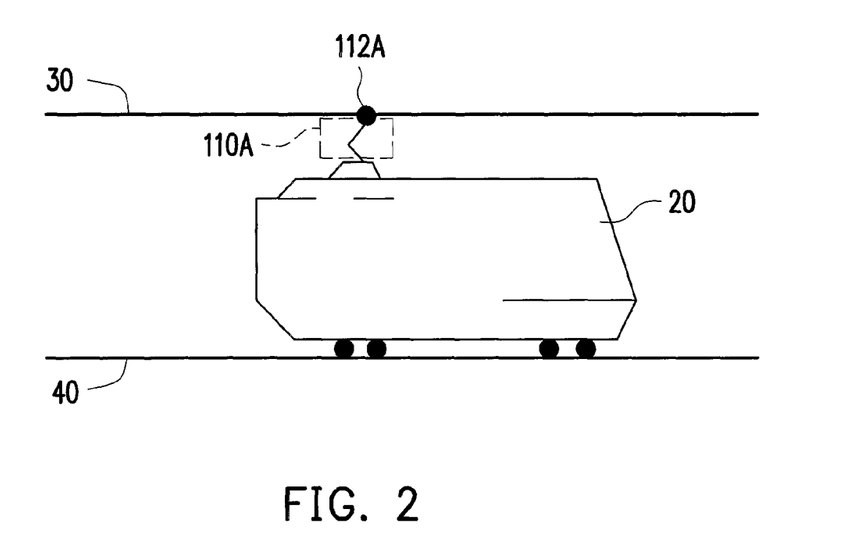
FIG. 2 is a schematic view illustrating a trolley wire of the electric train according to the embodiment of the invention.

FIG. 1 is a schematic view illustrating a collector device of an electric train according to an embodiment of the invention. FIG. 2 is a schematic view illustrating a trolley wire of the electric train according to the embodiment of the invention. Referring FIG. 1 and FIG. 2 in combination, a collector device 10 of an electric train 20 includes a collector unit 110 and a magnetic unit 120. The collector unit 110 has a first side AA, a second side BB and a graphite skateboard 112, wherein the first side AA and the second side BB are the two opposite sides of the collector unit 110, and the graphite skateboard 112 is preferably disposed on the first side AA. When the first side AA of the collector unit 110 is in contact with a power source having a magnetically permeable capacity via the graphite skateboard 112, an operation voltage HV may be drawn, wherein the power source may be a trolley wire 30 or a third rail 50. The third rail 50 is a rail outside of a ground rail 40 which may be used as another power source for supplying power to the electric train 20.

In the present embodiment, the magnetic unit 120 has an electromagnetic coil body 122. The magnetic unit 120 is configured at the second side BB of the collector unit 110 for providing an attractive force between the collector unit 110 and the trolley wire 30, or providing an attractive force between the collector unit 110 and the third rail 50. With the physical characteristics of the magnetic unit 120, when the collector unit 110 is in a contact loss situation, a contact loss distance between the graphite skateboard 112 and the trolley wire 30 or the third rail 50 may be reduced, so as to reduce a contact loss rate and suppress an occurrence of an electric arc. In addition, the magnetic unit 120 may indirectly reduce a resistance of the contact surface, so as to reduce a collector current loss of the electric train 20 and ensure a normal power supply quality.

On the other hand, the collector device 10 of the electric train 20 may further includes a control unit 130. The control unit 130 is electrically coupled to the collector unit 110 and the magnetic unit 120. Moreover, a magnetic force of the magnetic unit 120 may also be controlled by adopting a current feedback method. For example, a current sensing signal SI related to the trolley wire 30 or the third rail 50 may be obtained by a galvanometer. The control unit 130 may adjust a coil current of the electromagnetic coil body 122 according to the current sensing signal SI, so as to adjust the magnetic force of the magnetic unit 120. For example, when the current sensing signal SI shows that the current is increased, the electric train 20 may increase the poser to increase a train speed; in order to prevent the electric train 20 from causing the collector device 10 to be separated from the contact surface of the power source due to high speed, the control unit 130 may enable the magnetic unit 120 to increase the magnetic force (increase the coil current of the electromagnetic coil body 122); on the contrary, when the current sensing signal SI shows that the current is decreased, the control unit 130 is then enable the magnetic unit 120 to decrease the magnetic force.

In addition, if the current sensing signal SI suddenly becomes small not because of an increase of the required power by the electric train 20, a possible cause may be that the collector device 10 has a separation phenomenon with the contact surface of the power source separation, and the control unit 130, at this moment, may also increase the coil current of the magnetic unit 120. Therefore, the control unit 130 should adjust the coil current of the electromagnetic coil body 122 according to the actual possible situation or design.

Moreover, when the electric train 20 is in a process of moving or undergoes the contact loss, the control unit 130 may also cooperate with the train speed to sequentially increase and decrease a size of the magnetic force, so as to reduce the collector current loss. The control unit 130 may adjust the coil current of the electromagnetic coil body 122 according to the train speed signal SP, so as to adjust the magnetic force of the magnetic unit 120. For instance, if when the train speed signal SP is increased, then the control unit 130 increases the coil current of the electromagnetic coil body 122 to increase the magnetic force; if the when the train speed signal SP is decreased, the control unit 130 decreases the coil current of the electromagnetic coil body 122 to increase the magnetic force.

Noteworthily, the collector unit 110 may be a device such as a pantograph or a collector shoe. A main function of the pantograph or the collector shoe is to introduce the current on the trolley wire 30 into a main transformer inside of the electric train 20 as the power source for an illumination of the electric train 20 or air-conditioning. Relative functions of the pantograph and the collector shoe will be later explained in more detail.

Figure 3:
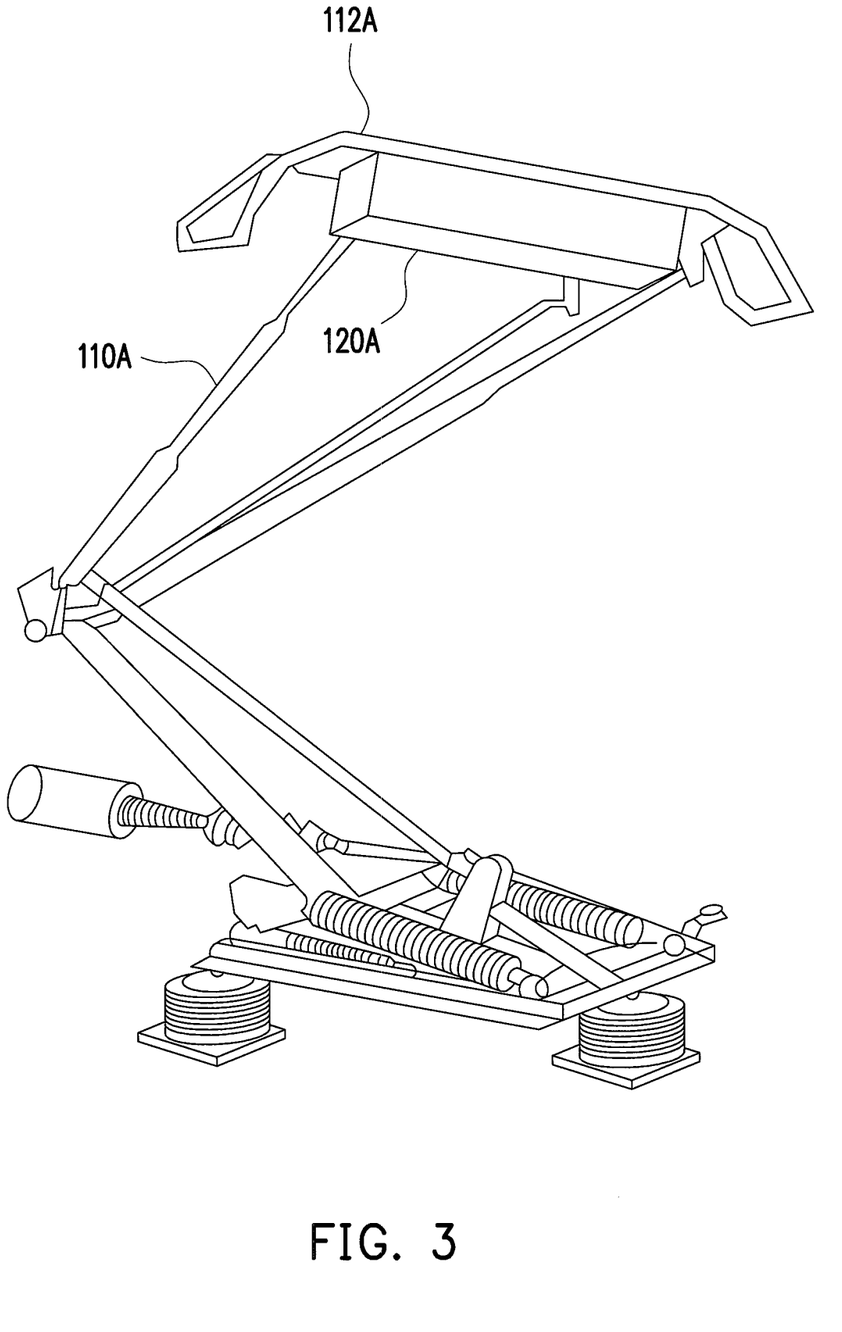
FIG. 3 is a perspective view illustrating a pantograph and a magnetic unit according to the embodiment of the invention.
Figure 4:
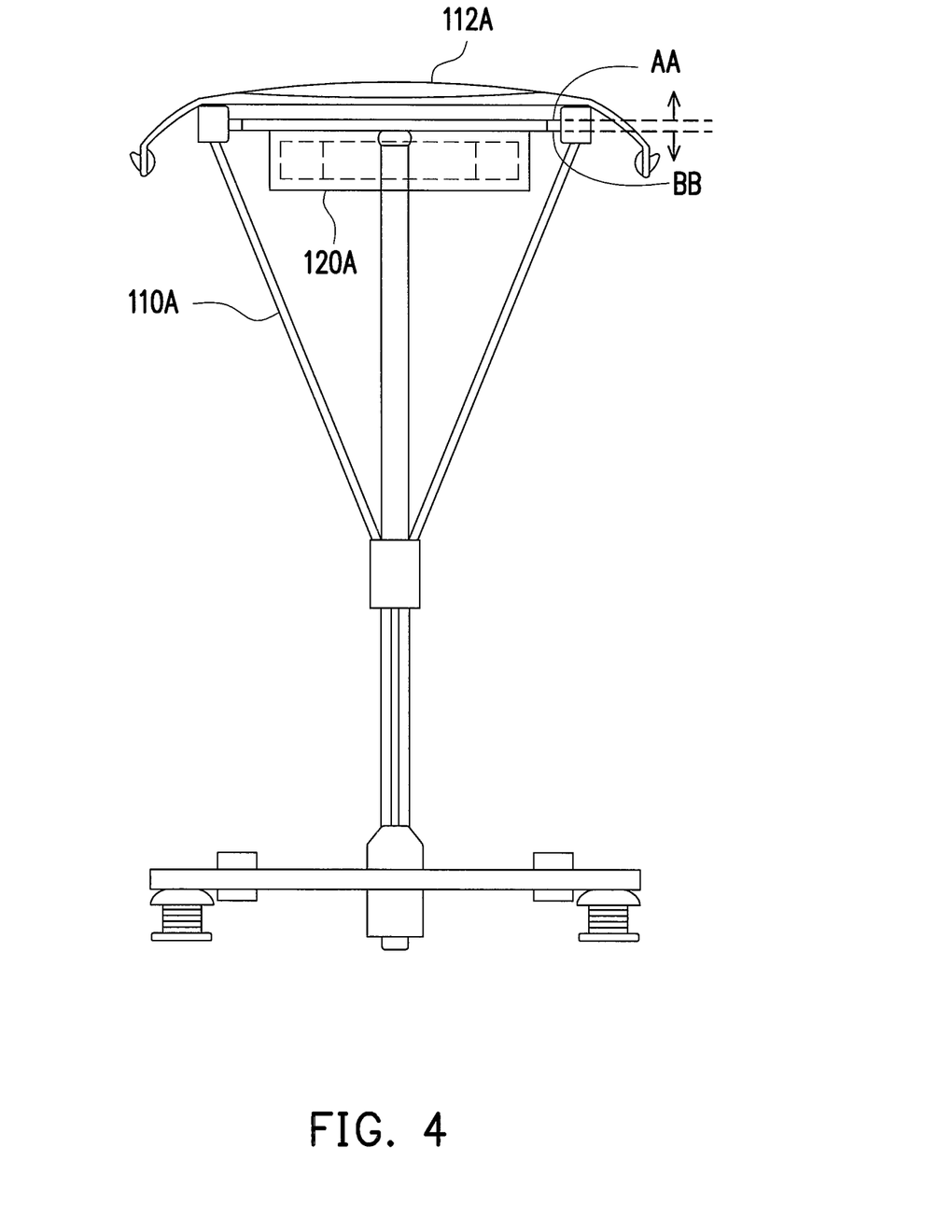
FIG. 4 is a front view illustrating the pantograph and the magnetic unit according to the embodiment of the invention.
Figure 5:
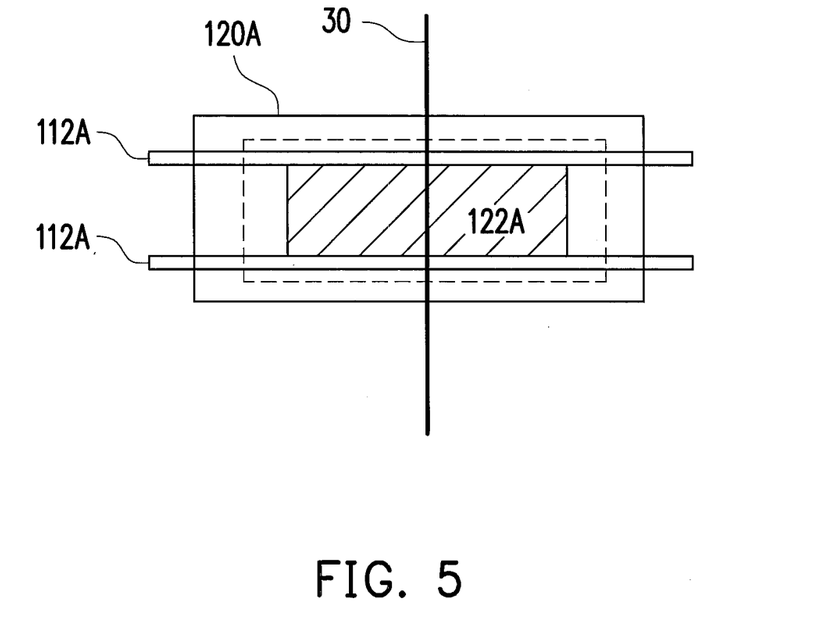
FIG. 5 is a top view illustrating the pantograph and the magnetic unit according to the embodiment of the invention.

FIG. 3 is a perspective view illustrating a pantograph and a magnetic unit according to the embodiment of the invention. FIG. 4 is a front view illustrating the pantograph and the magnetic unit according to the embodiment of the invention. FIG. 5 is a top view illustrating the pantograph and the magnetic unit according to the embodiment of the invention. Referring to FIG. 3 through FIG. 5, firstly, in FIG. 5, sequentially from top to bottom are a trolley wire 30, a graphite skateboard 112A, a magnetic unit 120A and an electromagnetic coil body 122A. The pantograph 110A in FIG. 3 appears to be in Z-shaped, and the pantograph 110A has a balance spring for adjusting expansion and contraction. The pantograph 110A in FIG. 4 has the first side AA, the second side BB and the graphite skateboard 112A, wherein the first side AA and the second side BB are the two opposite sides of the pantograph 110A. The magnetic unit 120A is configured at the second side BB of the pantograph 110A, and the trolley wire 30 is required to have a magnetically permeable capacity. Therefore, the first side AA of the pantograph 110A, when being in contact with the trolley wire 30 via the graphite skateboard 112A, increases an adsorption force between the graphite skateboard 112A and the trolley wire 30 due to an attractive force provided by the magnetic unit 120A, so that a resistance between the graphite skateboard 112A and the contact surface of the trolley wire 30 becomes small in order to reduce a collector current loss of the electric train, and thereby suppress an occurrence of the electric arc.

On the other hand, since the magnetic unit 120A has the electromagnetic coil body 122A therein, a proper insulating material may be coated at the periphery of the magnetic unit 120A, so as to enhance an insulating capability of the magnetic unit 120A when subjecting to a high current.

Figure 6:
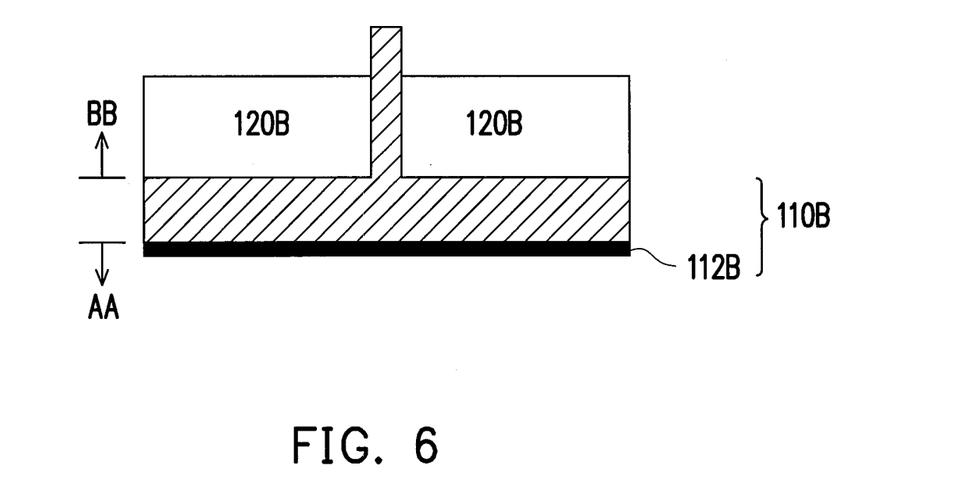
FIG. 6 is a schematic view illustrating a collector shoe and the magnetic unit according to the embodiment of the invention.

FIG. 6 is a schematic view illustrating a collector shoe and the magnetic unit according to the embodiment of the invention. Referring to FIG. 6, a collector shoe 110B has the first side AA, the second side BB and a graphite skateboard 112B, wherein the first side AA and the second side BB are the two opposite sides of the collector shoe 110B. The magnetic unit 120B is configured at the second side BB of the collector shoe 110B. The first side AA of the collector shoe 110B is in contact with the third rail via the graphite skateboard 112B.

FIG. 7 through FIG. 10 are schematic views illustrating a variety of contact types for the collector shoe and the third rail according to the embodiment of the invention. The third rail 50 is located outside of the electric train, and the design of the collector shoe has to be corresponded to the third rail 50.

In light of the foregoing, the magnetic unit 120B is configured at the second side of the collector shoes 110B to 110E. The collector shoes 110B to 110E are configured on the electric train, wherein each of the shapes of the collector shoes 110B to 110E therein is a bit different, but the collector shoe 110B to 110E are all in contact with the third rail 50 via the graphite skateboard of the first sides thereof.

Figure 7:
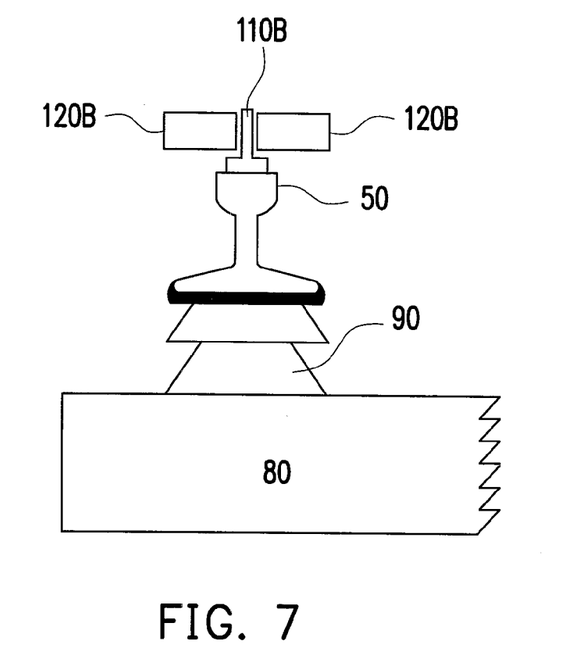
FIG. 7 through FIG. 10 are schematic views illustrating a variety of contact types for the collector shoe and the third rail according to the embodiment of the invention.
Figure 8:
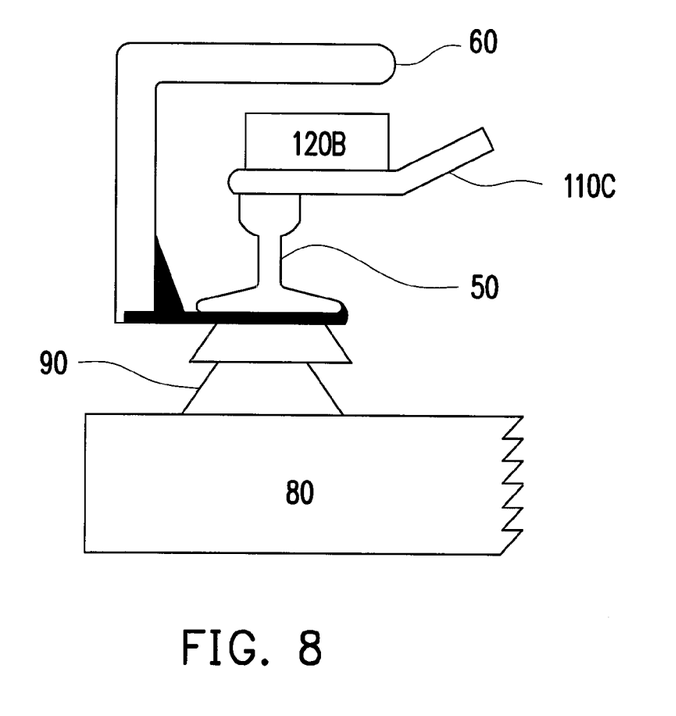
Figure 9:
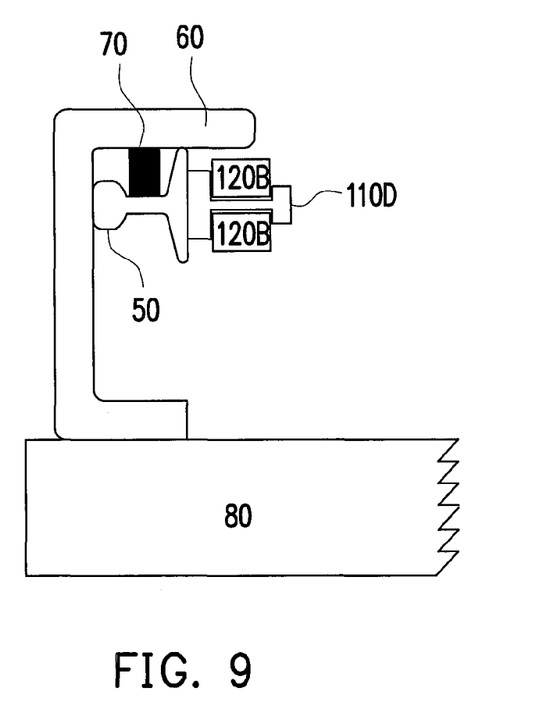
Figure 10:
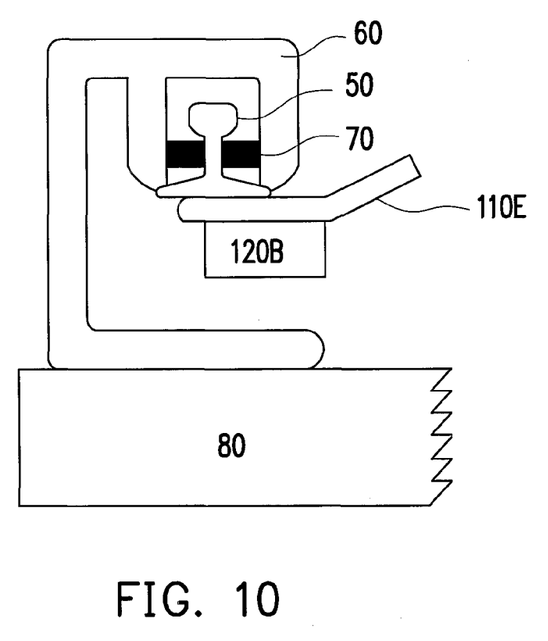

Sequentially referring to FIG. 7 through FIG. 10, the designs of the collector shoes in FIG. 7 through FIG. 10 have to be corresponded to the third rail 50. The third rail 50 in FIG. 7 is configured above a railroad tie 80 and an insulator 90. The third rail 50 in FIG. 8 is configured above the railroad tie 80 and the insulator 90, and the periphery of the third rail 50 has an insulating cover 60. The third rail 50 in FIG. 9 and FIG. 10 is configured above the railroad tie 80 and within the insulating cover 60, and the insulating cover 60 has a fixed body 70 for supporting the third rail 50. Moreover, implementations of the magnetic unit 120B and the collector shoe may be determined with regard to actual designs/application requirements as long as the existing functions of the magnetic unit 120B may be provided.

Figure 11:
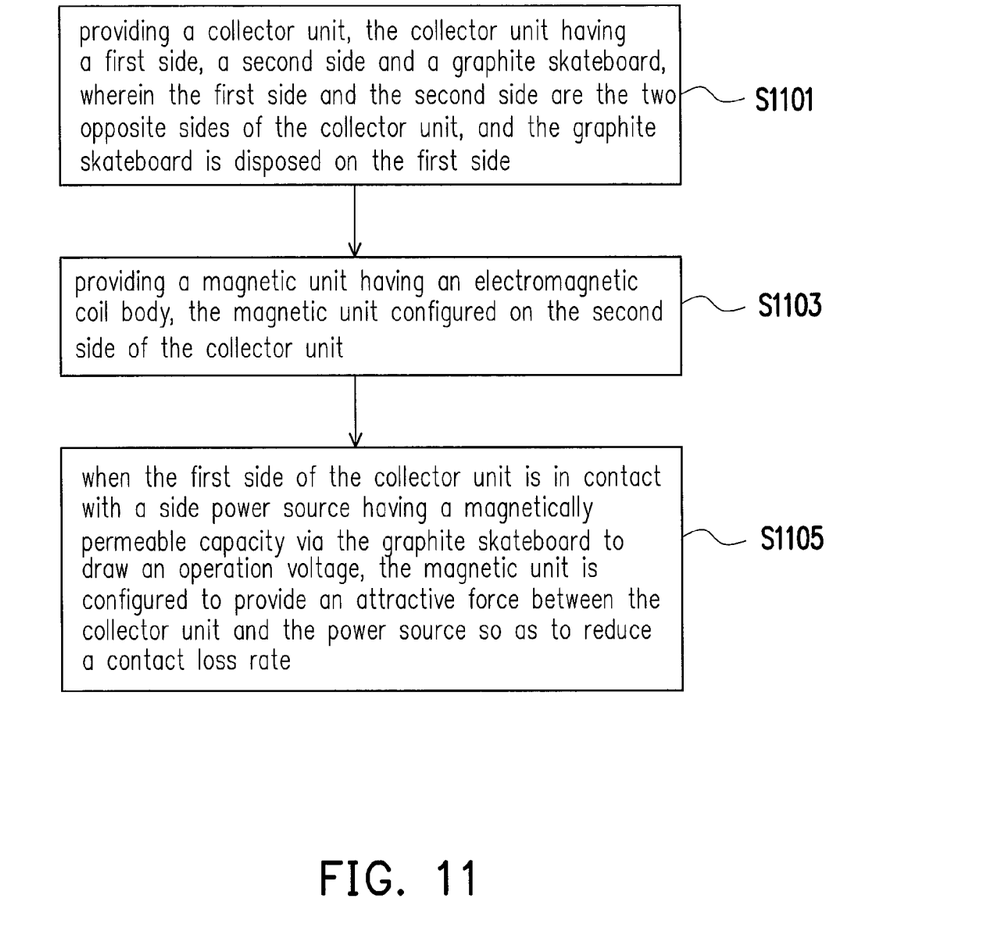
FIG. 11 is a flow chart illustrating a collector method of an electric train according to an embodiment of the invention.

According to the contents of the above-mentioned embodiments of the invention, a universal collector method of the electric train may be compiled. Specifically, FIG. 11 is a flow chart illustrating a collector method of an electric train according to an embodiment of the invention. Referring to FIG. 1 and FIG. 11 in combination, the collector method of the electric train of the present embodiment may include the following steps:

A collector unit 110 is provided, and the collector unit 110 has a first side AA, a second side BB and a graphite skateboard 112, wherein the first side AA and the second side BB are the two opposite sides of the collector unit 110, and the graphite skateboard 112 is disposed on the first side AA (step S1101);

A magnetic unit 120 having an electromagnetic coil body 122 is provided, and the magnetic unit 120 is configured on the second side BB of the collector unit 110 (step S1103); and When the first side AA of the collector unit 110 is in contact with a power source (a trolley wire 30 or a third rail 50) having a magnetically permeable capacity via the graphite skateboard 112 to draw an operation voltage HV, the magnetic unit 120 may provide an attractive force between the collector unit 110 and the power source (the trolley wire 30 or the third rail 50), so as to reduce a contact loss rate (step S1105).

In summary, in the collector device of the invention, the physical characteristics of the magnetic unit may be used to improve the contact loss situation of the collector unit, and thus may suppress the occurrence of the electric arc to reduce depletions of the collector unit and the trolley wire or the third rail, so as to enhance a power transmission quality of the electric train, thereby solving the problem described in the prior art.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

In addition, any of the embodiments or any of the claims of the invention does not need to achieve all of the advantages or features disclosed by the invention. Moreover, the abstract and the title are merely used to aid in search of patent documents and are not intended to limit the scope of the claims of the invention.

What is claimed is:

1. A collector device of an electric train comprising:
    a collector unit having a first side, a second side and a graphite skateboard, the first side and the second side being the two opposite sides of the collector unit, and the graphite skateboard disposed on the first side, wherein the first side of the collector unit is in contact with a power source having a magnetically permeable capacity via the graphite skateboard, so as to draw an operation voltage;
    a magnetic unit having an electromagnetic coil body, the magnetic unit configured on the second side of the collector unit for providing an attractive force between the collector unit and the power source so as to reduce a contact loss rate; and
    a control unit coupled to the collector unit and the magnetic unit;
    wherein the control unit is configured to adjust a coil current of the electromagnetic coil body according to a current sensing signal or a train speed signal related to the power source, so as to adjust a magnetic force of the magnetic unit;
    wherein when the train speed signal increases, the control unit increases the coil current, and when the train speed signal decreases, the control unit decreases the coil current.

2. The collector device of the electric train as recited in claim 1, wherein the power source is a trolley wire or a third rail.

3. The collector device of the electric train as recited in claim 1, wherein the collector unit is a pantograph or a collector shoe.

4. A collector method of an electric train comprising:
    providing a collector unit, the collector unit having a first side, a second side and a graphite skateboard, wherein the first side and the second side are the two opposite sides of the collector unit, and the graphite skateboard is disposed on the first side;
    providing a magnetic unit having an electromagnetic coil body, the magnetic unit configured on the second side of the collector unit;
    providing a control unit, the control unit coupled to the collector unit and the magnetic unit; and
    when the first side of the collector unit is in contact with a side power source having a magnetically permeable capacity via the graphite skateboard to draw an operation voltage, the magnetic unit is configured to provide an attractive force between the collector unit and the power source so as to reduce a contact loss rate;
    wherein the control unit is configured to adjust a coil current of the electromagnetic coil body according to a current sensing signal or a train speed signal related to the power source, so as to adjust a magnetic force of the magnetic unit;
    wherein when the train speed signal increases, the control unit increases the coil current, and when the train speed signal decreases, the control unit decreases the coil current.

5. The collector method of the electric train as recited in claim 4, wherein the power source is a trolley wire or a third rail.

6. The collector method of the electric train as recited in claim 4, wherein the collector unit is a pantograph or a collector shoe.

\* \* \* \* \*